United States Patent
Takeuchi

(10) Patent No.: US 8,937,533 B2
(45) Date of Patent: Jan. 20, 2015

(54) CONTACTLESS IC CARD READER AND DATA READING METHOD

(75) Inventor: Junro Takeuchi, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 28 days.

(21) Appl. No.: 13/058,249

(22) PCT Filed: Aug. 6, 2009

(86) PCT No.: PCT/JP2009/003762
§ 371 (c)(1),
(2), (4) Date: Mar. 22, 2011

(87) PCT Pub. No.: WO2010/018667
PCT Pub. Date: Feb. 18, 2010

(65) Prior Publication Data
US 2011/0163855 A1     Jul. 7, 2011

(30) Foreign Application Priority Data

Aug. 11, 2008    (JP) ................................. 2008-207204

(51) Int. Cl.
*H04Q 5/22*     (2006.01)
*G06K 7/00*     (2006.01)
(Continued)

(52) U.S. Cl.
CPC .......... *G06K 7/0008* (2013.01); *G06K 7/10198* (2013.01); *H04B 5/0031* (2013.01)
USPC ....................................................... 340/10.3

(58) Field of Classification Search
CPC . G06K 7/0008; G06K 7/10198; H04B 5/0031
See application file for complete search history.

(56) References Cited

U.S. PATENT DOCUMENTS 4,208,940 A  *  6/1980  Tsurubuchi ..................... 84/708
4,284,955 A  *  8/1981  Beno et al. ..................... 327/176
(Continued)

FOREIGN PATENT DOCUMENTS

JP     2000-182003     6/2000
JP     2001-339327     12/2001
(Continued)

OTHER PUBLICATIONS

Toshimasa et al, JP 2006-050406, Feb. 2006 Machine Translation.*
(Continued)

*Primary Examiner* — Amare Mengistu
*Assistant Examiner* — Crystal A Mathews
(74) *Attorney, Agent, or Firm* — Frommer Lawrence & Haug LLP

(57) ABSTRACT

A contactless IC card reader and a data reading method which are capable of improving data reading accuracy while preventing a decrease in processing speed. Specifically, in a contactless IC card reader which transmits signals composed of amplitude modulated carrier signals to a contactless IC card, the contactless IC card and reader communicate by means of an NRZ encoding method and an ASK modulating method for which the modulation depth has an arbitrary value. The contactless IC card reader is provided with a contactless control means which modulates/demodulates signals transmitted to/received from the contactless IC card, and a main control means which is electrically connected to the contactless control means and that controls the entire card reader. The modulation depth that is varied by the contactless control means based on the command sent from the main control means has multiple range widths with an arbitral value as the standard.

2 Claims, 2 Drawing Sheets

(51) Int. Cl.
*G06K 7/10* (2006.01)
*H04B 5/00* (2006.01)

(56) References Cited

U.S. PATENT DOCUMENTS

| | | | |
|---|---|---|---|
| 4,399,507 A * | 8/1983 | Cosgrove et al. | 712/219 |
| 4,455,606 A * | 6/1984 | Cushing et al. | 710/307 |
| 4,605,922 A * | 8/1986 | Blattman et al. | 340/552 |
| 5,432,293 A * | 7/1995 | Nonaka et al. | 84/607 |
| 6,122,296 A * | 9/2000 | Shih | 370/532 |
| 6,154,829 A * | 11/2000 | Mino et al. | 712/35 |
| 6,229,400 B1 * | 5/2001 | McCollough et al. | 331/17 |
| 6,476,952 B1 * | 11/2002 | Snawerdt | 398/141 |
| 6,580,531 B1 * | 6/2003 | Swanson et al. | 398/5 |
| 6,626,363 B2 * | 9/2003 | Arisawa | 235/492 |
| 7,181,665 B2 * | 2/2007 | Son | 714/742 |
| 7,546,092 B1 * | 6/2009 | Murdoch | 455/82 |
| 7,586,385 B2 * | 9/2009 | Rokhsaz | 333/17.3 |
| 8,184,978 B2 * | 5/2012 | Vorbeck et al. | 398/79 |
| 2005/0237160 A1 * | 10/2005 | Nolan et al. | 340/10.33 |
| 2005/0237163 A1 * | 10/2005 | Lee et al. | 340/10.51 |
| 2006/0238305 A1 * | 10/2006 | Loving et al. | 340/10.1 |
| 2007/0026825 A1 * | 2/2007 | Wilson | 455/130 |
| 2008/0030336 A1 * | 2/2008 | Endo et al. | 340/572.1 |
| 2008/0237345 A1 * | 10/2008 | Moullette et al. | 235/438 |
| 2010/0156540 A1 * | 6/2010 | De Graauw et al. | 330/295 |
| 2010/0167644 A1 * | 7/2010 | Winter et al. | 455/41.1 |
| 2010/0224682 A1 * | 9/2010 | Busch-Sorensen | 235/380 |

FOREIGN PATENT DOCUMENTS

| | | |
|---|---|---|
| JP | 2005-102057 | 4/2005 |
| JP | 2006-050406 | 2/2006 |
| JP | 2006-186882 | 7/2006 |
| JP | 2007-034947 | 2/2007 |
| JP | 2007-065976 | 3/2007 |

OTHER PUBLICATIONS

ISO/IEC 14443-2 "Identification Cards—Contactless integrated circuit(s) cards—Proximity Cards—Pard 2: Radio frequency power and signal interface;" Jul. 1, 2001; pp. 1-17.*

* cited by examiner

CONTACTLESS IC CARD READER AND DATA READING METHOD

The present application claims priority from PCT Patent Application No. PCT/JP2009/003762 filed on Aug. 6, 2009, which claims priority from Japanese Patent Application Nos. JP 2008-207204 filed on Aug. 11, 2008 the disclosures of which is incorporated herein by reference in its entirety.

BACKGROUND OF THE INVENTION

1. Field of the Invention

The present invention relates to a contactless IC card reader which reads and writes data with respect to contactless IC cards and to its data reader method; more specifically, it relates to a technology to improve data reading accuracy.

2. Description of Related Art

In recent years there has been widespread use of a contactless IC card into which an RF (Radio Frequency) IC chip and an antenna coil are built and which transmits and receives data by electromagnetic interaction via the antenna (see Unexamined Japanese Patent Application 2005-102057 ("JP 2005-102057"); and Unexamined Japanese Patent Application 2006-50406 ("JP 2006-50406")). The reading of data recorded in contactless IC cards is not affected by dirty surfaces or wear on the cards and therefore has advantages in higher accuracy than the optical reading of data recorded in barcodes, etc.

There are three types of the above-described contactless IC card reader with which contactless IC cards are used: Type A, Type B and Type C; they take different cards for reading and writing depending on the specifications and usage [of the cards]. While Type C is mainstream in Asian countries including Japan, Type A and Type B are mainstream according to the international standard. Note that Type A and Type B are different in amplitude modulation depth (the former 100%, the latter 10%).

It is generally determined whether or not [the card reader] can read and write based on standard cards at the design stage, and it is determined whether or not [the card reader] can read and write by using the actually-used cards at the detail check and evaluation stage.

Even if the contactless IC card is a standard card, some may not be practically used for reading and writing. This is because there are variations in card properties such as the difference in shape or the number of windings of the antenna coil and the difference in the IC chip performance. This may be found particularly in Type B cards in which the amplitude modulation depth is set as low as 10%, as described above.

As a measure to solve such a problem, the resistance at the transmission output unit inside the contactless IC control may be made a variable resistance. By adjusting this variable resistance, the card that is unreadable and unwritable could be made readable and writable. However, it is difficult to determine in advance the precise adjustment of the resistance because the adjustment width of the resistance depends on the loop antenna (antenna coil) of the contactless IC card reader which is to be designed. In other words, [the precise adjustment] is preferably determined based on the contactless IC card which will be actually used or the environment in which the contactless IC card reader is actually installed; however, [the contactless IC card reader] is generally manufactured after the variable resistance value is selected, and therefore, it is difficult to make any changes afterwards.

According to the technology disclosed in the above-described JP 2005-102057 and JP 2006-50406, the modulation depth can be changed afterwards. However, in JP 2005-102057, the phase of the carrier wave contained in the response signal which is received from the contactless IC card needs to be checked for whether or not the modulation depth should be changed (paragraphs [0025] through [0027] of JP 2005-102057); also in JP 2006-50406, the modulation depth needs to be calculated based on the amplitude detected by an amplitude detection circuit (paragraphs [0017] and [0018] in JP 2006-50406); thus, in either case, a longer time may be required for processing. In particular, the demand to shorten the processing time for data reading from the contactless IC card is high compared to the magnetic cards and contact IC cards, demanding faster data reading From the viewpoint of shortening the processing time, JP 2005-102057 needs a data processing using a differential amplifier and level adjustment circuit and JP 2006-50406 needs a data processing that uses the maximum amplitude and the minimum amplitude.

SUMMARY OF THE INVENTION

The present invention is devised considering the above problems and its objective is to provide a contactless IC card reader which is capable of improving data reading accuracy while preventing a decrease in the processing speed, and to provide its data reading method.

In order to solve the above problems, the present invention provides the following:

(1) A contactless IC card reader which transmits signals composed of amplitude modulated carrier signals to a contactless IC card, wherein the contactless IC card and the contactless IC card reader communicate with each other by means of an NRZ (Non Return to Zero) encoding method and by means of an ASK (Amplitude Shift Keying) modulation method for which the modulation depth has an arbitrary value; the contactless IC card reader is provided with a contactless control means that modulates/demodulates signals transmitted to/received from the contactless IC card and a main control means that is electrically connected to the contactless control means and that controls the entire card reader; the modulation depth, which is varied by the contactless control means based on a command sent from the main control means, has multiple range widths with an arbitrary value as the standard.

According to the present invention, the contactless IC card and the contactless IC card reader communicate by means of an NRZ encoding method and an ASK modulation method for which the modulation depth has an arbitrary value such as 10%, and the contactless IC card reader is provided with a contactless control means that modulates/demodulates signals and a main control means that controls the entire card reader. Also, the modulation depth, which is varied by the contactless control means based on a command sent by the main control means, has multiple range widths with an arbitrary value as the standard; therefore, data reading accuracy can be improved.

In other words, if the communication fails between the contactless IC card and the contactless IC card reader, a predetermined command is sent from the main control means to the contactless control means, and the modulation depth can be adjusted afterwards and easily (to an ideal value) within multiple range widths (9%, 10%, 11%, etc., for example) with an arbitrary value of 10% as the standard (it can be changed from 9% to 10%, for example); therefore, data reading accuracy can be improved. In particular, to change the modulation depth, there is no need of a data processing as in JP 2005-102057 and JP 2006-50406, but only for an ideal modulation depth to be selected from the multiple range widths that are set in advance, thus preventing a decrease in the processing speed. Note that "multiple range widths" have an arbitrary value such as 10% as the standard, and therefore, it is especially effective for a Type B contactless IC card reader.

(2) The contactless IC card reader wherein the aforementioned range widths are in the range from 8% to 14%, and the contactless control means adjusts the modulation depth by changing the circuit constant at the transmission output unit provided inside.

According to the present invention, the aforementioned range widths are in the range from 8% to 14%, and when a transmission output unit circuit constant inside is changed by the contactless control means, the modulation depth is also adjusted; therefore, data reading accuracy can be improved with a simple and inexpensive configuration while the processing speed is prevented from decreasing.

(3) The contactless IC card reader wherein when a command to change the register value is sent from the main control means, the aforementioned contactless control means adjusts the modulation depth by changing the register value associated with the transmission output unit circuit constant.

According to the present invention, when a command to change the register value is sent from the main control means, the contactless control means adjusts the modulation depth by changing the register value associated with the transmission output unit circuit constant; therefore, the processing speed can be prevented from decreasing with just the change of the register value, which is a processing with a light load, while data reading accuracy is improved.

(4) A data reading method of a contactless IC card reader which transmits signals composed of amplitude modulated carrier signals to contactless IC cards, wherein the contactless IC card and the contactless IC card reader communicate by means of an NRZ encoding method and by means of an ASK modulation method for which modulation depth has an arbitrary value; the contactless IC card reader is provided with a contactless control means that modulates/demodulates signals transmitted to/received from the contactless IC card and a main control means that is electrically connected to the contactless control means and that controls the entire card reader; and [the method] includes a step in which when the contactless IC card and the contactless IC card reader are unable to communicate, the main control means sends to the contactless control means a command to change the register value whose modulation depth has an arbitrary value, a step in which the contactless control means changes the modulation depth using multiple range widths, and a step in which when the contactless IC card and the contactless IC card reader become able to communicate, the register value at that point is regarded as an ideal value and registered in the contactless control means.

According to the present invention, the data reading accuracy can be improved while the processing speed is prevented from decreasing in the same manner as the above-described contactless IC card reader. In particular, a command to change the register value whose modulation depth has an arbitrary value (10%, for example) is sent from the main control means to the contactless control means when "the contactless IC card and the contactless IC card reader are unable to communicate"; therefore, the processing won't require as much time as the above-mentioned JP 2005-102057 and JP 2006-50406, it can determine quickly whether or not the modulation depth should be changed, and accordingly the processing speed can be improved.

As described above, according to the present invention, the modulation depth that will be varied has multiple range widths with an arbitrary value such as 10% as the standard; therefore, only an ideal modulation depth is selected from multiple range widths that are set in advance in order to vary the modulation depth, and data reading accuracy can be improved while the processing speed is prevented from decreasing.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
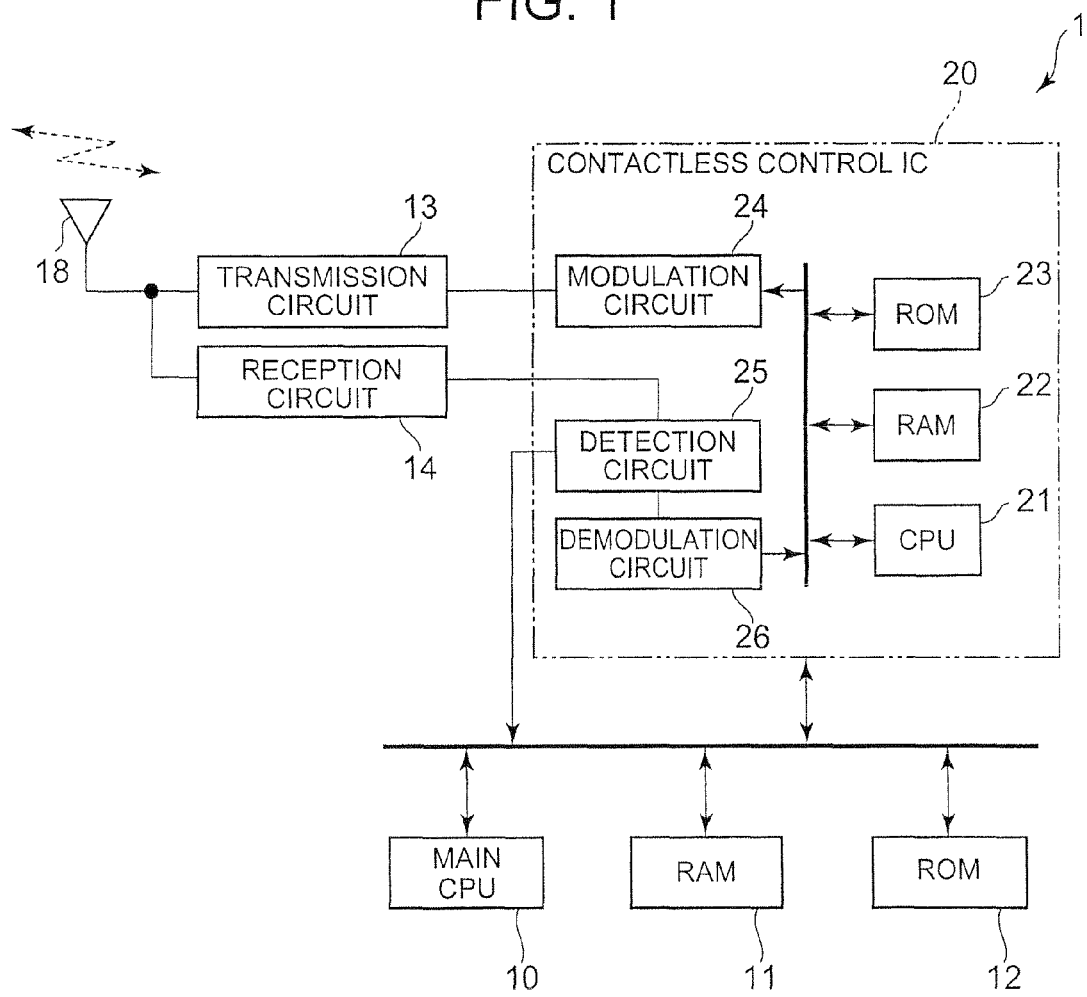
FIG. 1 shows a block diagram of an electrical configuration of a card reader of the embodiment of the present invention.

Electrical Configuration:

FIG. 1 is a block diagram of an electrical configuration of a contactless IC card reader 1 of the embodiment of the present invention. Note that in this embodiment, the contactless IC card reader transmits signals composed of amplitude modulated carrier signals to a contactless IC card, and communicates with the contactless IC card by means of an NRZ encoding method and by means of an ASK modulation method for which the modulation depth has an arbitrary value (10% is adopted in this embodiment).

In FIG. 1, the contactless IC card reader (1) has a main CPU (10), a RAM (11), a ROM (12), a transmission circuit (13), a reception circuit (14), an RF antenna (loop antenna) (18) and a contactless control IC (20).

The main CPU (10) as a main control means administers the total control of the entire contactless IC card reader (1) and reads out various programs from the ROM (12) and executes them. The RAM (11) functions as a work area of the main CPU (10). The ROM (12) stores programs to send to the contactless control IC (20) commands such as a command to change the register value.

The contactless control IC (20) is electrically connected to the main CPU (10), etc. via a bus, functions as the contactless control means to modulate/demodulate the signals transmitted to/received from the (contactless IC) card, and has a CPU (21), a RAM (22), a ROM (23), a modulation circuit (24), a detection circuit (25) and a demodulation circuit (26). The CPU (21) mainly administers the total control of the contactless control IC (20), and reads out various programs from the ROM (23) and executes them. The RAM (22) functions as a work area of the CPU (21). The ROM (23) stores programs to read and write data with respect to the card.

The modulation circuit (24) of the contactless control IC (20) modulates the data which will be written to the card into an RF frequency band and sends the modulated data to the transmission circuit (13). Then, the transmission circuit (13) writes data to the card via the RF antenna (18). More specifically described, [the transmission circuit (13)] communicates with the antennae coil buried into the card through electromagnetic induction and writes desired data to the card.

Also, the detection circuit (25) of the contactless control (20) detects the data transmitted from the card via the RF antenna (18) and sends the detection signal to the demodulation circuit (26). Then, the demodulation circuit (26) detects the data from the detection signal based on a predetermined threshold and forwards the data to the CPU (21). In this manner, the signal from outside received via the RF antenna (18) is processed such that the data is detected from the signal and A/D converted at the detection circuit (25) and the demodulation circuit (26) respectively and then sent to the CPU (21).

In this embodiment, upon receiving a command to change the register value sent from the main CPU (10), the CPU (21) of the contactless control IC (20) changes the transmission output resistance inside the contactless control IC (20) (inside the modulation circuit (24)) to change the modulation depth. The transmission output resistance is an example of the "transmission output unit circuit constant" described in the claim; however, the present invention is not limited to this. For example, when resistance is adjusted at the circuit after IC output, [the transmission output unit circuit constant] may adopt a circuit constant of that circuit. At that time, the CPU (21) varies (changes) the modulation depth to an ideal value among the modulation depth (8%, 9%, 10%, 11%, 12%) which has multiple range widths with 10% as the standard. 10% is an example of the "arbitrary value" described in the claim; however, the present invention is not limited to this. More specifically described, the CPU (21) changes the register value associated with the transmission output resistance to consequently change the transmission output resistance and ultimately to vary the modulation depth (change the magnetic field modulation factor). The range widths which the modulation depth has are preferably 8% to 14% with the standard of 10% because the contactless IC card reader is Type B.

Note that Type A and Type B are generally used for the ISO/IEC 14443 standard. While the modulation method in data transmission with respect to the contactless IC card and the modulation depth are an ASK (amplitude shift keying) 100% in Type A, the modulation depth needs to be varied in the range from 8% to 14% in Type B. Thus, Type B largely varies in chip property and antenna property more than [Type A], and therefore, the present invention can be applied to type B more effectively (contributing to the improvement of data reading accuracy).

Also, the above-described register value depends on the property of the loop antenna which is to be designed. Therefore, the register value varies according to the RF antenna (18). Also, the register value to be changed has four levels in this embodiment (2 levels in the positive direction and 2 levels in the negative direction), and the transmission output resistance also differs in the amount of change per range width depending on the RF antenna (18) which is to be designed. Therefore, it is preferred that the necessary number of range widths be determined by the actual evaluation of the antenna which is to be manufactured. The operation flow centered on the main CPU (10) and/or the contactless control IC (20) in the contactless IC card reader is described hereinafter.

Figure 2:
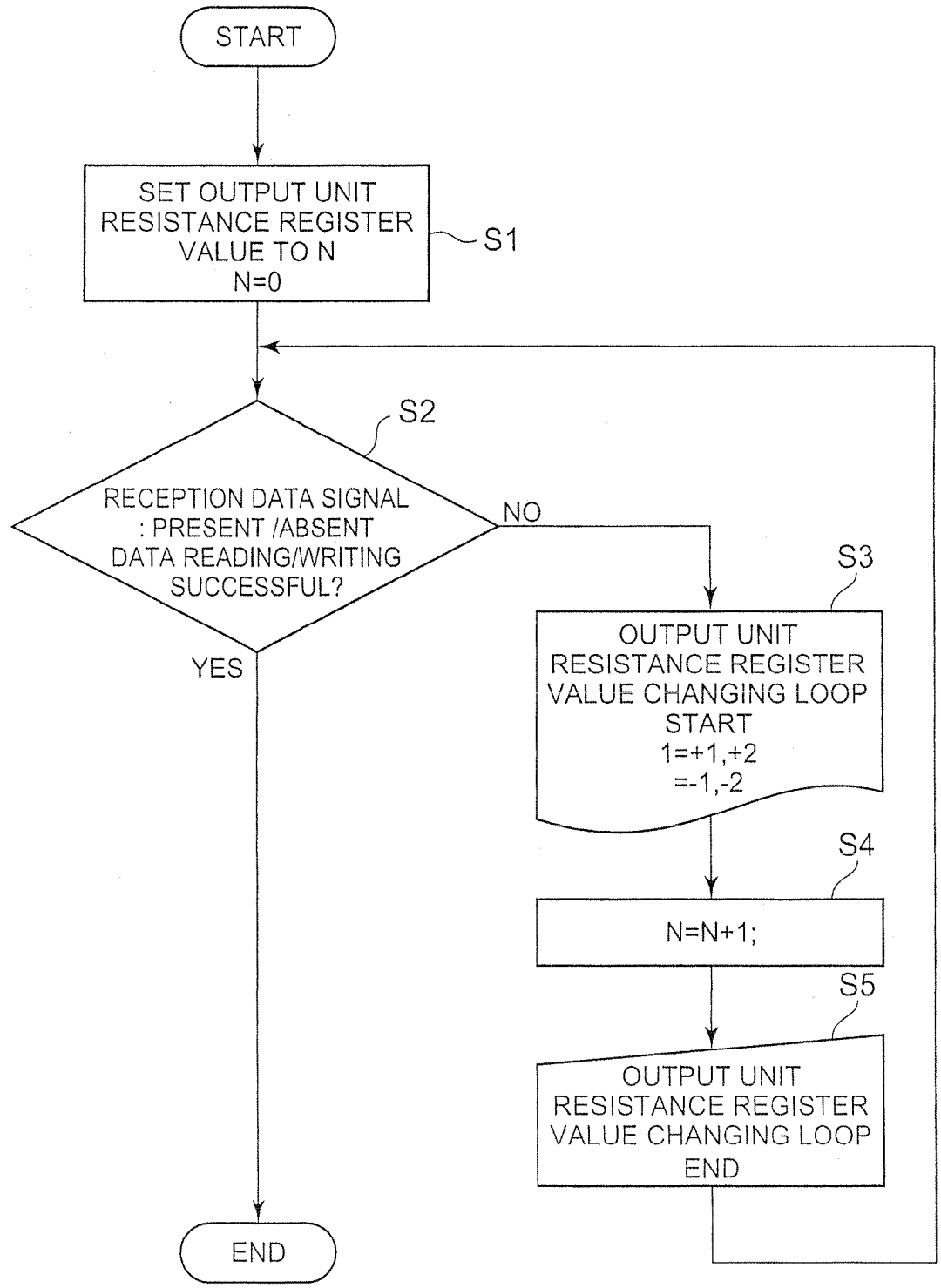
FIG. 2 shows a flowchart of data processing of the main CPU and the other CPU in the contactless IC card reader of this embodiment.

Flow of Data Processing:

FIG. 2 is a flowchart showing the flow of the data processing centered on the main CPU (10) and the CPU (21) in the contactless IC card reader of this embodiment.

In FIG. 2, the output unit resistance register value is first set to N as default (Step 1). Next, the main CPU (10) detects the presence/absence of a reception data signal and judges whether or not the data writing was successful (Step 2). When the data writing was successful (Step S2: Yes), the sub-routine is finished and a series of data processing steps of FIG. 2 is ended.

On the other hand, when the data writing has failed (Step S2: No), the CPU (21) of the contactless contact IC (20) starts a computation with a loop [command] to change the output unit resistance register value. More specifically described, the computation is carried out by substituting the variable with +1, +2, −1 and −2 in sequence. By limiting the substitution to those four numbers, the processing is prevented from being complex and the processing speed is prevented from decreasing. In detail, when the register value, N, is added by its variable, 1 (Step S4), the output unit resistance register value change loop is ended (Step S5).

When the register value is rewritten in this manner, the main CPU (10) performs contactless communication with the contactless IC card again (Step S2). Then, when the contactless communication which was impossible is enabled, the register value at the point when the communication was enabled is determined to be the ideal value, and that register value is written. Note that the manufacture needs to write a program in advance for the register change (the fixed value) for communication to be possible (in order to enable communication).

Note that when there is no improvement on the status of the contactless communication even after going through the above-described loop (Step S3 through Step S5), the cause [of the problem] cannot be dealt with by the loop of FIG. 2, and the data processing is ended.

Also, the range widths within which the transmission output unit resistance variable register value is varied preferably consists of four levels (two levels in the positive direction and two levels in the negative direction); however, the range widths here can be increased or decreased more than the current number of levels. Since the standard card is a subject, this adjustment will solve the status where the contactless IC card reading/writing has failed; for this reason, it is preferred that the number of loop [commands] be fewer so that no extra time needs to be spent on adjustment.

Major Effects of the Embodiment:

As described above, according to the contactless IC card reader of this embodiment, the following can be achieved: when the card that is actually used (Type B, in particular) cannot be read and/or written, the transmission output resistance is varied by using the actual operating environment and the card that is actually used to consequently change the modulation depth, not by newly downloading a program to change the register value manually to verify (that the CG communication is enabled). Also, the unreadable and unwritable condition of the card can be avoided (corrected) by a user.

When the contactless IC card and the contactless IC card reader 1 cannot communicate, the main CPU (10) sends to the contactless control IC (20) a command to change the register value for which the modulation depth is 10%. Meanwhile, the modulation depth is varied in the contactless control IC (20) using multiple range widths. Then, when the communication is enabled between the contactless IC card and the contactless IC card reader 1, the register value at that point is registered as an ideal value in the contactless control IC (20). In this manner, while the processing speed is prevented from decreasing by the process of register change, which has a light processing load, data reading accuracy can be improved.

Possibility of Industrial Use:

The contactless IC card reader 1 of the present invention is useful to improve data reading accuracy.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1 Card reader
10 Main CPU
11 RAM
12 ROM
13 Transmission circuit
14 Reception circuit
18 RF antenna
20 Contactless control IC
21 CPU
22 RAM
23 ROM
24 Modulation circuit
25 Detection circuit
26 Demodulation circuit

What is claimed is:

1. A contactless IC card reader configured to transmit signals composed of amplitude modulated carrier signals to a contactless IC card, comprising:
    a loop antenna;
    a contactless control means configured to modulate/demodulate signals transmitted to/received from the contactless IC card; and
    a main control means which is electrically connected to the contactless control means and administers the control of the entire card reader;
    wherein the contactless IC card reader is configured to communicate with the contactless IC card by means of an NRZ encoding method and by means of an ASK modulation method for which a modulation depth has an arbitrary value;
    wherein the modulation depth is varied by the contactless control means based on a predetermined command sent from the main control means, the modulation depth having multiple range widths with the arbitrary value as a standard, and wherein the range widths are in the range from 8% to 14% with the arbitrary value of 10% as the standard;
    wherein the contactless control means is configured to change the modulation depth by changing a register value associated with a circuit constant of a transmission output unit provided inside the contactless control means when the contactless control means receives the predetermined command to change the register value from the main control means;
    wherein the register value is first set to N as a default wherein the default register value, N, depends on the property of the loop antenna and leads to a modulation depth having the arbitrary value; and
    wherein the contactless control means is configured to change the register value from N to N+1, N+2, N−1, and N−2 in sequence.

2. A data reading method of a contactless IC card reader which transmits, via a loop antenna, signals composed of amplitude modulated carrier signals to a contactless IC card, wherein the contactless IC card communicates with the contactless IC card reader by means of an NRZ encoding method and by means of an ASK modulation method for which the modulation depth has an arbitrary value, wherein the contactless IC card reader being provided with a contactless control means configured to modulate/demodulate signals transmitted to/received from the contactless IC card and a main control means which is electrically connected to the contactless control means and which administers the control of the entire card reader, the method comprising:
    a step in which, when communication between the contactless IC card and the contactless IC card reader fails, a predetermined command is sent from the main control means to the contactless means to change transmission output resistance register value from a default register value, N, to N+1, N+2, N−1, and N−2 in sequence wherein the default register value depends on the property of the loop antenna and leads to a modulation depth having the arbitrary value;
    a step in which, the change of register value leads to a change in modulation depth; and
    a step in which, when the communication is enabled between the contactless IC card and the contactless IC card reader, the register value at that point is registered as an ideal value in the contactless control means.

* * * * *